UNITED STATES PATENT OFFICE.

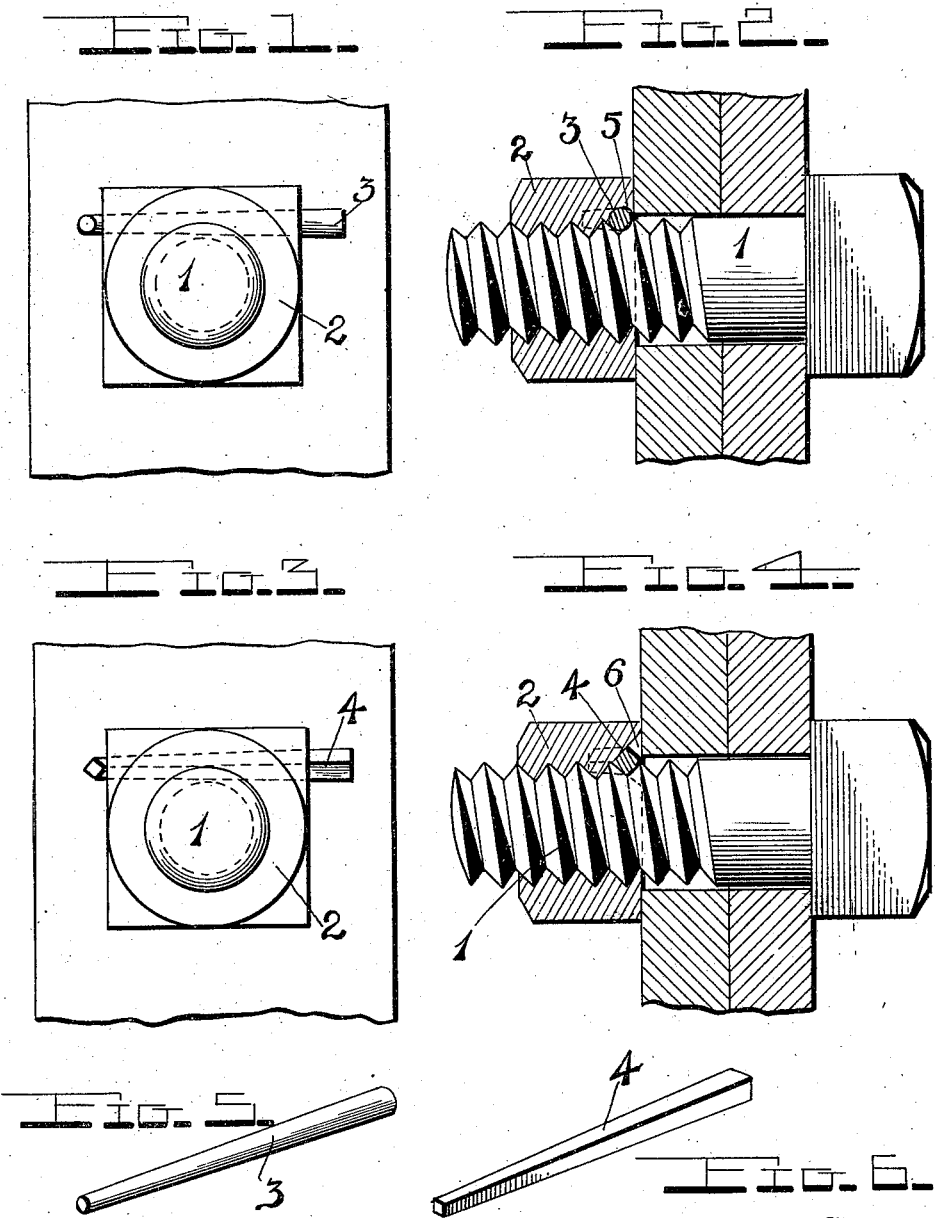

LINLEY WILDMAN, OF ELLWOOD CITY, PENNSYLVANIA, ASSIGNOR OF ONE-FOURTH TO WILLIAM E. RENNER, OF ELLWOOD CITY, PENNSYLVANIA.

NUT-LOCK.

1,010,207.  Specification of Letters Patent.  Patented Nov. 28, 1911.

Application filed December 15, 1910. Serial No. 597,392.

*To all whom it may concern:*

Be it known that I, LINLEY WILDMAN, a citizen of the United States, residing at Ellwood City, in the county of Lawrence and State of Pennsylvania, have invented certain new and useful Improvements in Nut-Locks; and I do declare the following to be a full, clear, and exact description of the invention, such as will enable others skilled in the art to which it appertains to make and use the same.

This invention relates to improvements in nut locks.

One object of the invention is to provide a simple and inexpensive construction of nut lock comprising a locking pin adapted to be driven through a suitable passage in the nut and into engagement with the threads of the bolt thereby effectually fastening the nut against rotation on the bolt.

Another object is to provide a nut lock of this character which may be readily removed when desired to permit the unscrewing of the nut.

In the accompanying drawings, Figure 1 is an end view of a bolt and nut showing the application of my invention thereto. Fig. 2 is a central longitudinal section thereof. Fig. 3 is an end view of a bolt and nut showing a modified construction of the invention. Fig. 4 is a central longitudinal section of the form shown in Fig. 3. Fig. 5 is a detail perspective view of the locking pin shown in Figs. 1 and 2 of the drawing.
Fig. 6 is a similar view of the locking pin shown in Figs. 3 and 4 of the drawing.

Referring more particularly to the drawings 1 denotes a bolt and 2 denotes the nut which is screwed on the bolt and which is provided with my improved locking device whereby the same is held against casual removal from the bolt.

My improved locking device comprises a tapered pin which may be of circular form in cross section as shown at 3 in Figs. 1, 2 and 5 of the drawings or which may be of rectangular form in cross section as shown at 4 in Figs. 3, 4 and 6 of the drawings forming the cutting edges for the purposes hereinafter described.

In the form of the invention employing the tapered pin 3 the nut 2 is provided with a tapered substantially circular passage 5 which is formed therethrough adjacent to its inner side and which intersects or cuts through a portion of one side of the thread of the nut, as clearly shown in Figs. 1 and 2 of the drawings. After the nut has been screwed up on the bolt and into engagement with the object to be fastened thereby, the pin 3 is driven through the passage 5 and when thus driven will firmly engage or embed itself into the threads of the bolt and into the object thereby rigidly securing the nut in position on the bolt. After being thus driven through the nut the tapered end of the pin is bent at an angle in any direction against the adjacent side of the nut thereby positively preventing the loosening or removal of the pin.

In the form of the invention shown in Figs. 3, 4 and 6 of the drawings the nut is shown as having formed in its inner side a transverse V-shaped notch or groove 6 which intersects or cuts into the threads of the nut as shown. Through the V-shaped notch or groove 6 is adapted to be driven the rectangular, tapered pin 4, said pin when thus driven, fitting into and firmly engaging the threads of the bolt and having its outer corner binding against the adjacent surface of the object to which the bolt and nut are applied. In this form of the invention the projecting smaller end of the pin is also bent at an angle against the adjacent side of the nut thereby securely holding the pin in place.

While I have herein shown and described two forms of locking pins it is obvious that I may employ other forms of pins and variously shaped passages in the nuts to receive the same. The locking pin when thus driven through the nut and into engagement with the threads of the bolt will securely fasten the nut against casual removal or loosening, and will permit the nut to be readily removed by straightening the end of the key and driving the same back through the passage in the nut.

From the foregoing description taken in connection with the accompanying drawings, the construction and operation of the invention will be readily understood without requiring a more extended explanation.

Various changes in the form, proportion and minor details of construction may be resorted to without departing from the principle or sacrificing any of the advantages of this invention as defined in the appended claim.

What is claimed is:

In a nut lock, a nut having formed therethrough a tapered passage, a tapered locking pin having cutting edges and corresponding in cross sectional shape to the shape of the passage in the nut and adapted to be driven through said passage and into engagement with the threads of the bolt and object to be secured, the projecting end of said pin being adapted to be bent at an angle against the adjacent side of the nut, thereby preventing the casual loosening or removal of the pin.

In testimony whereof I have hereunto set my hand in presence of two subscribing witnesses.

LINLEY WILDMAN.

Witnesses:
R. E. BUTLER,
W. E. RENNER.